United States Patent
Ahti et al.

(10) Patent No.: US 8,512,096 B2
(45) Date of Patent: Aug. 20, 2013

(54) SYSTEM FOR REMOVING MATERIAL FROM COMPONENTS

(75) Inventors: Robert Allan Ahti, Hillsborough, NH (US); David Donald Genest, Deerfield, NH (US); George Michael Archer, Bedford, NH (US); Benjamin John Kortz, Rutland, VT (US); Brian Daniel Rohm, Seville, OH (US); Michael Anthony Umney, Oregonia, OH (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 11/952,472

(22) Filed: Dec. 7, 2007

(65) Prior Publication Data

US 2009/0149119 A1    Jun. 11, 2009

(51) Int. Cl.
B24B 49/00    (2012.01)

(52) U.S. Cl.
USPC .............................. 451/11; 451/296

(58) Field of Classification Search
USPC .................. 451/5, 8, 11, 296, 297, 310, 311
See application file for complete search history.

(56) References Cited

U.S. PATENT DOCUMENTS

| | | | |
|---|---|---|---|
| 3,491,488 A | 1/1970 | Schaller et al. | |
| 4,512,709 A | 4/1985 | Hennekes et al. | |
| 4,604,787 A | 8/1986 | Silvers, Jr. et al. | |
| 4,621,398 A | 11/1986 | Kleiman | |
| 4,654,949 A * | 4/1987 | Pryor | 29/407.04 |
| 4,875,275 A | 10/1989 | Hutchinson et al. | |
| 5,077,941 A * | 1/1992 | Whitney | 451/5 |
| 5,133,156 A | 7/1992 | Arms et al. | |
| 5,193,314 A | 3/1993 | Wormley et al. | |
| 5,241,792 A * | 9/1993 | Naka et al. | 451/24 |
| 5,357,714 A * | 10/1994 | Landhuis | 451/311 |
| 5,386,665 A * | 2/1995 | Heim | 451/5 |
| 5,441,437 A * | 8/1995 | Hulstedt | 451/1 |
| 5,460,536 A | 10/1995 | Cullen | |
| 5,771,553 A | 6/1998 | Sim et al. | |
| 5,830,046 A * | 11/1998 | Dugger et al. | 451/297 |
| 5,934,974 A * | 8/1999 | Tzeng | 451/6 |
| 6,224,462 B1 | 5/2001 | Yokoyama et al. | |

(Continued)

FOREIGN PATENT DOCUMENTS

| DE | 293537 A | * | 9/1991 |
|---|---|---|---|
| DE | 300355 A5 | * | 6/1992 |

(Continued)

OTHER PUBLICATIONS

Search Report and Written Opinion issued in connection with application PCT/US2008/081256, Jul. 17, 2009.

(Continued)

*Primary Examiner* — Robert Rose
(74) *Attorney, Agent, or Firm* — General Electric Company; Sushupta T. Sudarshan; David J. Clement

(57) ABSTRACT

A system for performing a polishing operation on a component is disclosed, the system comprising a robot, a fixture, a mount system for attaching the fixture to a robotic arm and a drive system mounted on the fixture for driving a polishing tool such that the location of the point of contact of the polishing tool with respect to the component is maintained constant during the polishing operation.

8 Claims, 9 Drawing Sheets

(56) References Cited

U.S. PATENT DOCUMENTS

| | | | |
|---|---|---|---|
| 6,544,112 B1 * | 4/2003 | Fuchs | 451/297 |
| 6,602,110 B2 | 8/2003 | Yi et al. | |
| 7,008,362 B2 | 3/2006 | Fitzpatrick | |
| 7,331,104 B2 | 2/2008 | Carasso et al. | |
| 7,442,155 B2 | 10/2008 | Ou et al. | |
| 2004/0123447 A1 | 7/2004 | Ahti et al. | |
| 2004/0142803 A1 | 7/2004 | Fitzgibbon | |
| 2009/0144958 A1 | 6/2009 | Ahti et al. | |

FOREIGN PATENT DOCUMENTS

| | | | |
|---|---|---|---|
| DE | 4241293 A1 | | 6/1994 |
| EP | 1757411 A1 | | 2/2007 |
| GB | 2334468 A | | 8/1999 |
| JP | 59205264 A | * | 11/1984 |
| JP | 01135458 | | 5/1989 |
| JP | 01146654 A | * | 6/1989 |
| JP | 02131857 A | * | 5/1990 |
| JP | 05285817 | | 11/1993 |
| JP | 2002370116 | | 12/2002 |
| JP | 2005022049 | | 1/2005 |
| JP | 2007-290095 A | | 11/2007 |
| WO | 9112111 A1 | | 8/1991 |

OTHER PUBLICATIONS

Search Report and Written Opinion issued in connection with application PCT/US2008/082178, Jun. 25, 2009.

Office Action from corresponding JP Application No. 2010-536953, dated Apr. 2, 2013.

Office Action from corresponding JP Application No. 2010-536955, dated Mar. 26, 2013.

* cited by examiner

SYSTEM FOR REMOVING MATERIAL FROM COMPONENTS

BACKGROUND OF THE INVENTION

This invention relates generally to manufacturing components, and more specifically to methods and interchangeable apparatus for accurately and controllably locating tools on workpieces during manufacturing operations such as polishing, deburring, materials removal and other machining and inspection operations.

Complexly shaped articles, such as blisks used in aircraft engines, are manufactured by techniques using specially shaped tooling that accomplish material removal from the work piece. In an example of particular interest, an integral compressor blade/disk (BLISK) structure of a gas turbine engine is manufactured as a single piece by machining methods such as milling and electro chemical machining (ECM). Finish machining operations such as polishing and deburring of machined components such as BLISKs are needed and have to be performed so as to avoid damaging these expensive components. Due to the complex geometries involved in BLISKs, many of the finishing operations are done manually.

Multi-axis robots which reproduce the motions of humans have sometimes been used for finish machining operations such as polishing and deburring. For example, for deburring of complex shaped articles such as BLISKs, conventional multi-axis robots using an air powered abrasive belt tool at the end of a robot arm have been used. However, these conventional robot arms use the same tool previously controlled by humans and reproduce the motions of a human performing this task. This approach has severely limited the use of robots for finishing operations on complex geometries such as BLISKs because the abrasive belt polishing tool must be kept away from critical geometric features that are not easily accessible. To avoid costly damage to these expensive components, the conventional abrasive belt tool must be kept away from critical geometry due to its constantly changing overall length and true position due to inherent belt stretching and belt tracking. This is especially a problem in robotic or automatic machining systems which lack the hand-eye coordination of humans. The constantly changing true position and tool conditions such as stretching and tracking of the machining tool have severely limited the use of robotic polishing and deburring of critical components such as BLISKs. Manufacturing individual components of a fixture for use in machining or inspection operations inherently involves some variations due to manufacturing tolerances and assembly stack-ups. These manufacturing tolerances and assembly stack-ups conventionally have resulted in variations in the location of the machining or inspection tool center point. In manufacturing operations a large number of tool assemblies and robots are used and conventional methods of accounting for the manufacturing variations in tools are not adequate to ensure precise location and control of tool center point within complex geometry parts such as BLISKs.

Accordingly, it would be desirable to have a system for performing automated finish machining operations on complex geometries such as BLISKs without causing damage to the component. It would be desirable to have a device that maintains the true position in space of the contact point of the machining tool regardless of changes in tool conditions such as belt wear, stretching, tracking, tension changes and other causes. It is desirable to have a method of making a device for use in manufacturing and inspection operations on complex geometries that can maintain the true position in space of a tool that can be controlled automatically in robots or other automated systems. It is desirable to have a method of manufacturing a tool assembly such that various tools can be interchanged while maintaining the precision of location of the tool center point.

BRIEF DESCRIPTION OF THE INVENTION

The above-mentioned need or needs may be met by exemplary embodiments which provide a system for performing a polishing operation on a component, the system comprising a robot, a fixture, a mount system for attaching the fixture to a robotic arm and a drive system mounted on the fixture for driving a polishing tool such that the location of the point of contact of the polishing tool with respect to the component is maintained constant during the polishing operation.

In another embodiment, a device for polishing a component is disclosed, the device comprising a fixture, a contact arm mounted on the fixture, the contact arm having a contact roller, a motor for driving a polishing belt around the contact roller, wherein the motor is mounted on the fixture such that the location of the point of contact of the polishing belt is maintained constant during the polishing.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
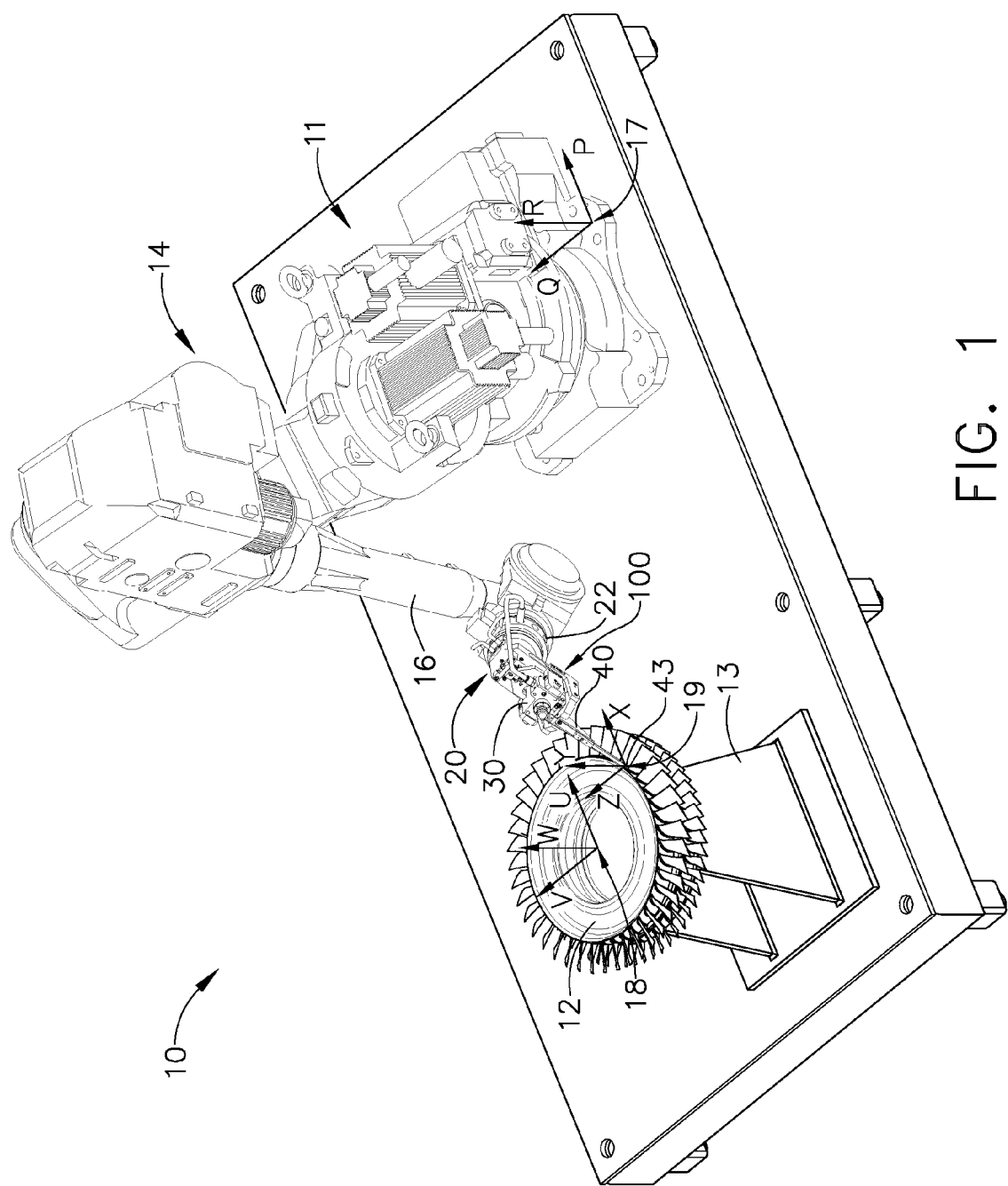
FIG. 1 shows an exemplary embodiment of the present invention of a robotic system for deburring a gas turbine engine BLISK.

Referring to the drawings wherein identical reference numerals denote the same elements throughout the various views, FIG. 1 shows an exemplary embodiment of the present invention of a robotic system for deburring a gas turbine engine BLISK. A conventional robot 14, having a conventional robotic arm 14, is shown in FIG. 1. The Robot 14 is mounted conventionally to the ground or a suitable platform. The robot 14 has a stationary coordinate system 17 for use as a reference for programming the location of the tool point in space, represented by the tool point coordinate system 19. A fixture 20 that holds a machining device 100 is mounted using a mount system 22 on the robotic arm 16. The machining device 100 and the mount system 22 are shown in more detail in FIGS. 2-8. The component 12 to be machined is mounted on a suitable fixture 13, having a component coordinate axis 18 suitably located with respect to the robot coordinate axis 17. The robotic arm typically has multiple degrees of freedom to translate and rotate with respect to the robot coordinate system 17. Similarly the component 12 being machined may be conventionally mounted with multiple degrees of freedom with respect to the coordinate system 18.

In the exemplary embodiment shown in FIG. 1, a drive system 30 that drives a machining tool, such as a polishing tool 40, is mounted on the fixture 20. In order to effect material removal from the component 12, the machining tool, such as the polishing tool 40, contacts the component at a point of contact 43. The path in space that the tool traverses during machining or inspection is programmed using conventional methods. However for finishing operations on complex geometries such as a BLISK, this normal tool path programming is not sufficient due to the changes in the true position of the tool contact point arising from contact forces and from wear of the tool during machining. This is especially true in polishing operations where the amount of material removed from the component is small. The risk of a tool mark or mis-machining in intricate geometries in complex parts such as BLISK is high unless the true position of the contact point is absolutely controlled regardless of the tool conditions. In the exemplary embodiment of the present invention shown in FIG. 1-8, the spatial location of the true position of the point of contact 43 of the tool has a fixed relationship with respect to the coordinate system 17 of the robot or other machining center regardless of the variations that might occur due to tool wear, tool belt tracking, tool belt tension changes or other reasons. This enables the programming of the location of the point of contact 43 in an automated machining system, such as a robot 14 or machining center (not shown), such that it can predictably follow, in a controlled way, and maintain a constant relationship with the intricate geometries of complex parts such as a BLISK. In a further aspect of the invention, as described subsequently herein, safety mechanisms to avoid damaging the component 12 during incidents such as tool breakage or belt tension loss or break are incorporated.

In the exemplary embodiment of a system for polishing shown in FIG. 1, a polishing tool 40 using a polishing belt 41 contacts a BLISK (shown as item 12) at a contact point 43 that is programmed to follow the contours of the BLISK surfaces and edges for removing burrs. The polishing belt 41 is driven by a drive system 30. The drive system 30 is mounted flexibly in a fixture 20 such that the spatial location of the contact point 43 has a constant relationship with the local geometry of component 12 and is maintained constant during the polishing operation. Any machining induced forces or tool wear or other sources that tend to change the tool path geometry during machining are accommodated by the flexibility that is designed into the unique mounting system for the drive system 30. A flexible mounting system that can be used as above is described in detail subsequently herein.

Figure 2:
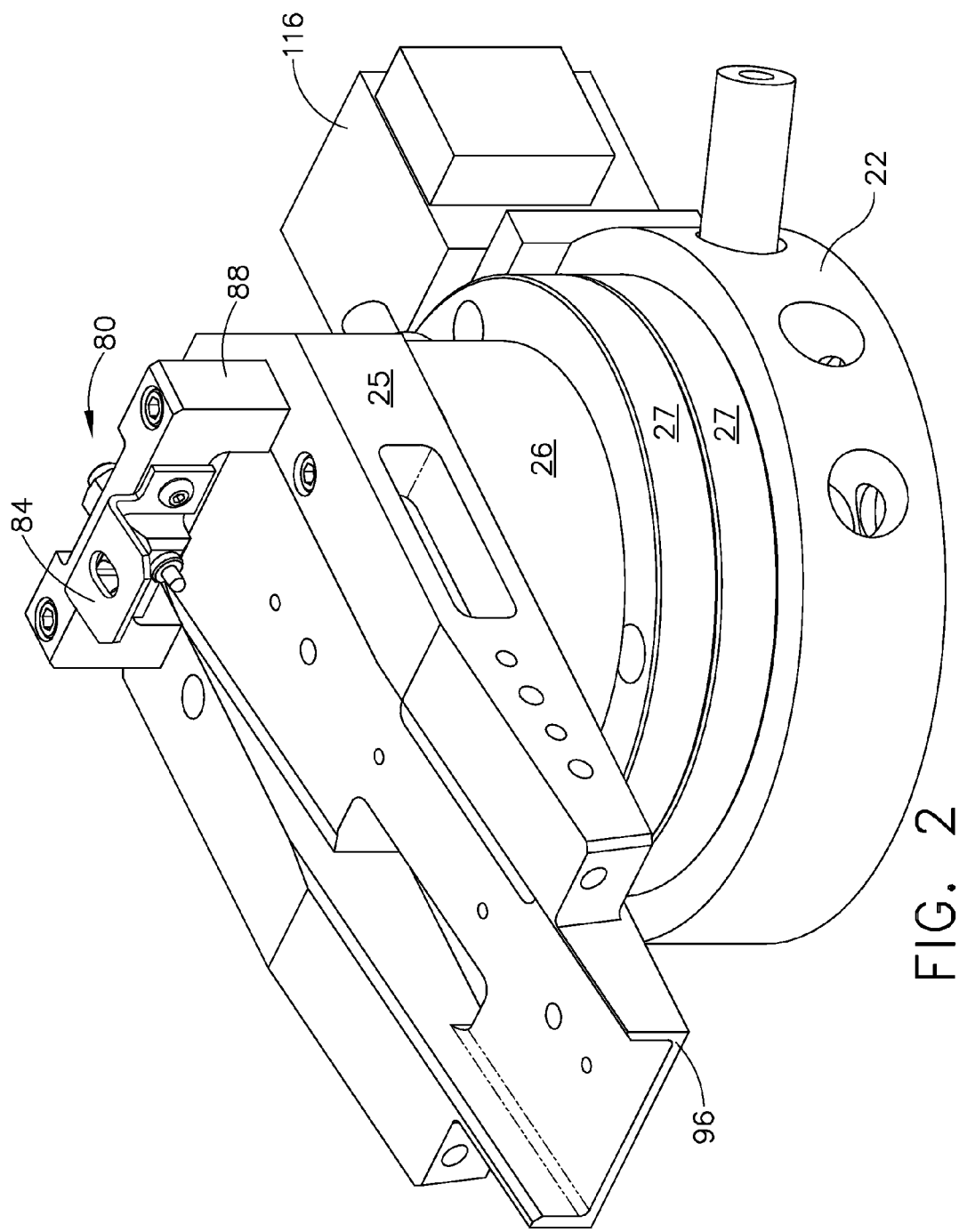
FIG. 2 shows an isometric view of a partially assembled tool forming a portion of an exemplary embodiment of the present invention of a device for removing material from complex components.
Figure 3:
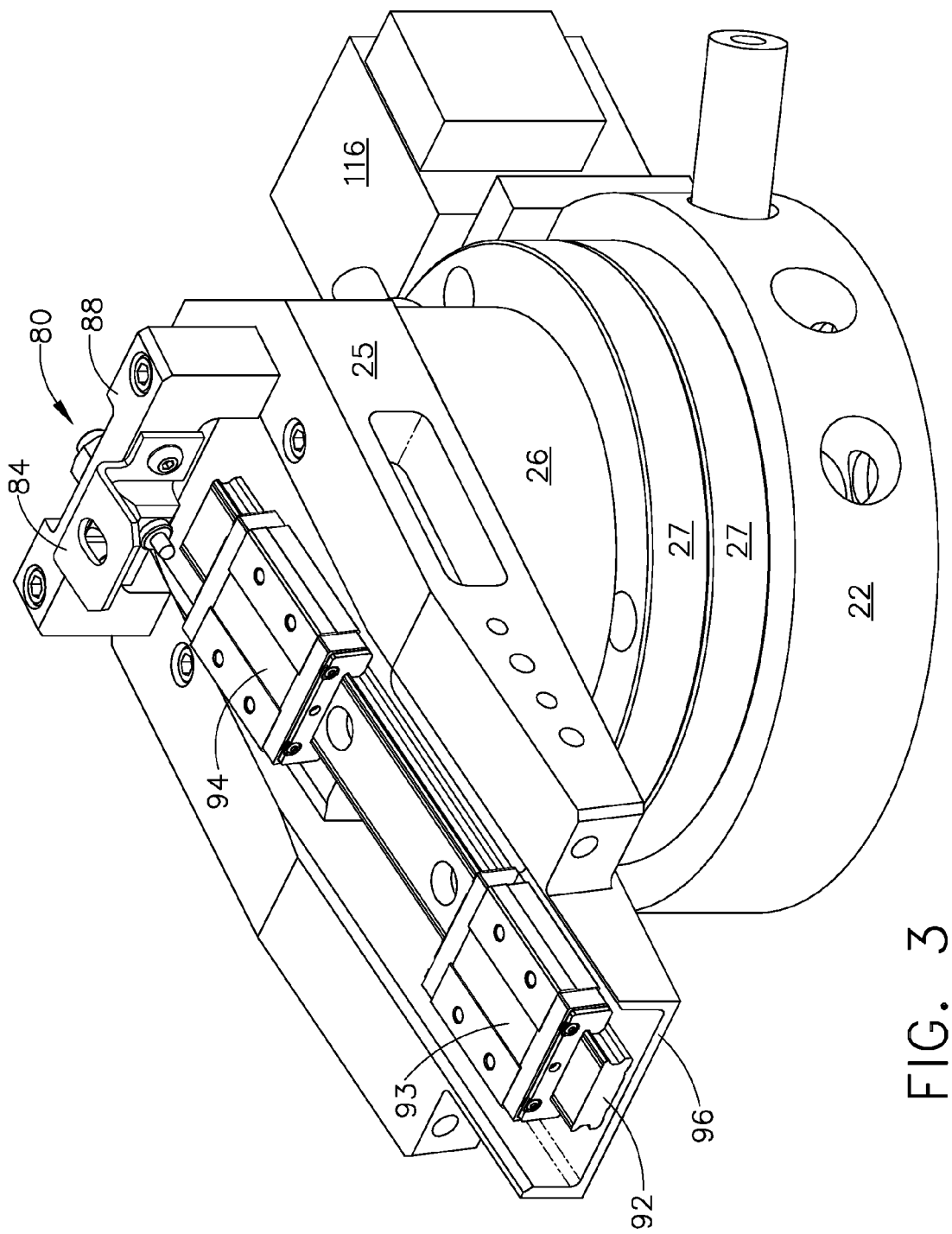
FIG. 3 shows an isometric view of a partially assembled tool forming a portion of an exemplary embodiment of the present invention of a device for removing material from complex components, including bearings.
Figure 4:
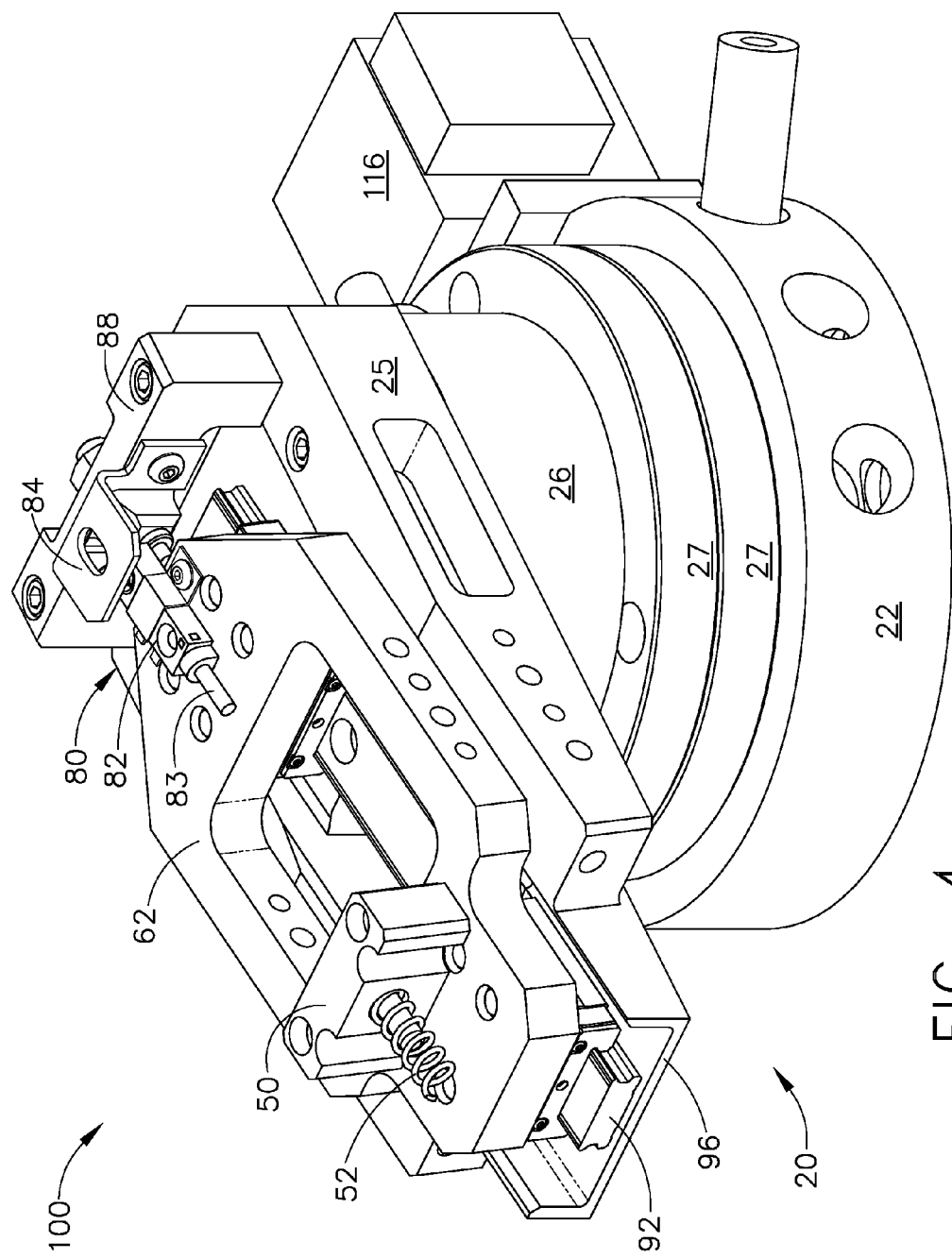
FIG. 4 shows an isometric view of a partially assembled tool forming a portion of an exemplary embodiment of the present invention of a device for removing material from complex components, including a motor carriage.
Figure 5:
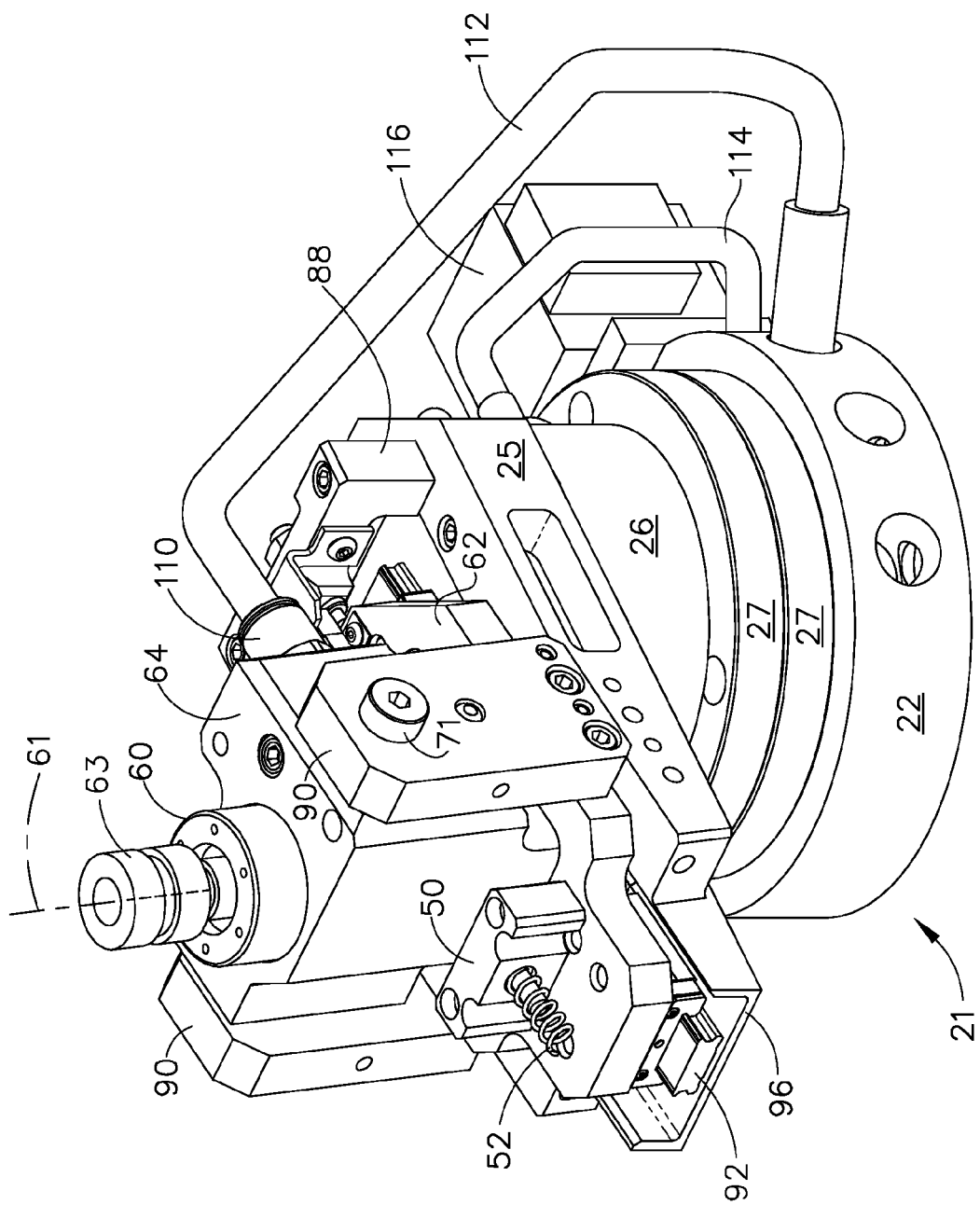
FIG. 5 shows an isometric view of a partially assembled tool forming a portion of an exemplary embodiment of the present invention of a device for removing material from complex components, including a motor.
Figure 6:
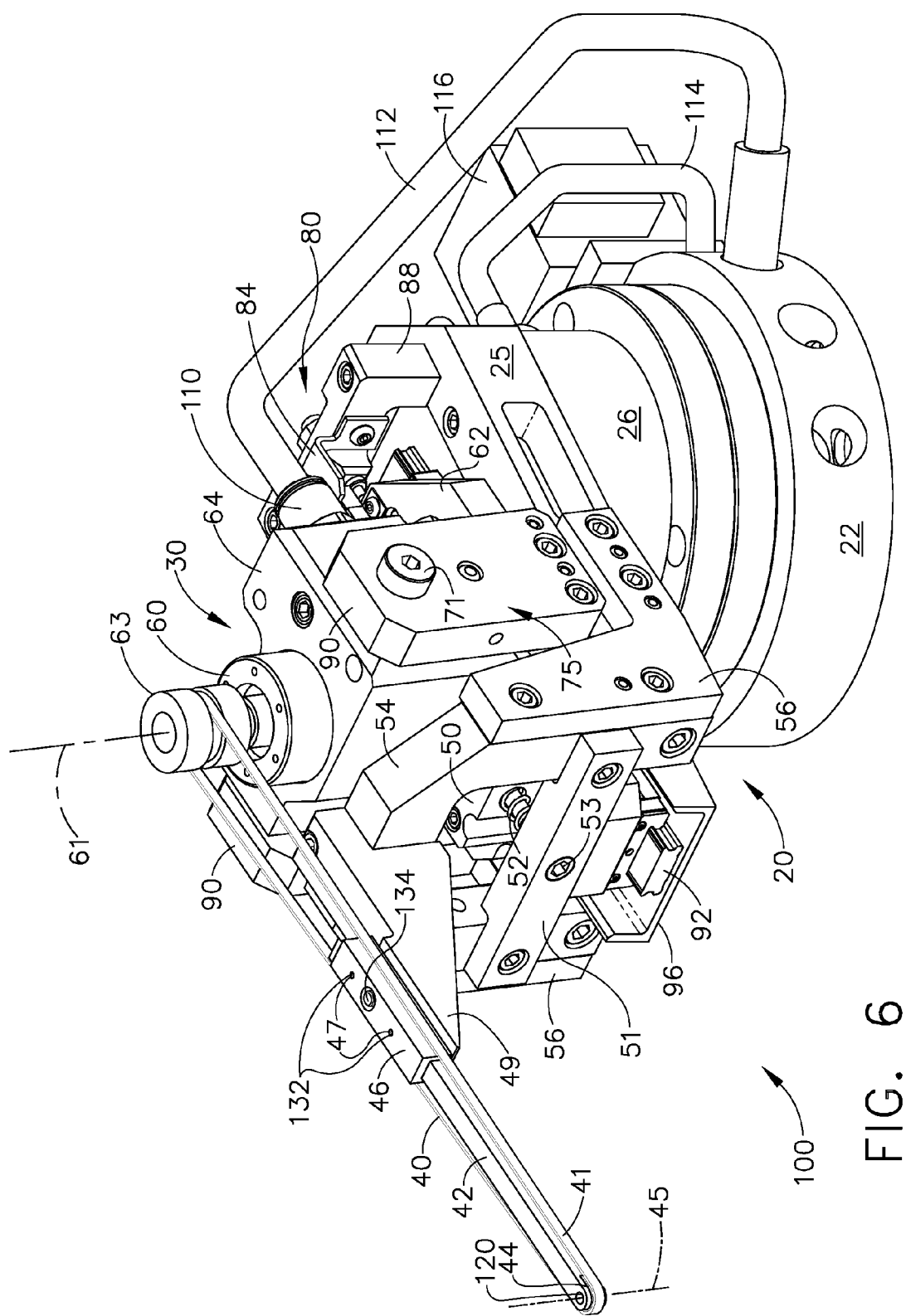
FIG. 6 shows an isometric view of an exemplary embodiment of the present invention of a device for polishing a component.

FIGS. 2, 3 and 4 show partial assemblies of an exemplary embodiment of a fixture 20 for flexibly mounting a drive system 30 as described previously. FIG. 5 shows a motor 60 mounted in the fixture 20. FIG. 6 shows an assembled view of a device 100 which comprises a motor 60 and a polishing tool 40 mounted in the fixture 20. The exemplary embodiment of the fixture comprises a conventional tool mount system 22 that is used to attach the entire assembly 100 quickly to the robotic arm 16 of a conventional robot system 14 or a machining center (not shown). Adaptor plates 27 may be optionally used as necessary to attach a conventional rotary actuator 26 to the tool mount system 22. The rotary actuator 26 enables a rotational degree of freedom to the machining tool assembly, such as for example, the polishing tool 40 shown in FIG. 1. The rotary actuator is powered by a conventional pneumatic motor (not shown) powered by air supplied by a pneumatic supply line 114. Alternatively, the rotary actuator 26 may be powered by a conventional electrical motor (not sown).

A base 25 is attached using conventional attachment means to the top of the rotary actuator such that the entire base 25 and other components attached to can be rotated as needed during machining using the rotary actuator 26. The base comprises a centrally located channel 96 that has a number of tapped holes for receiving attachment screws. A bumper block 88 is attached on top of the base 25 near the rear side of the base 25. A rail 92 is attached to the channel 96 using conventional means. A forward bearing 93 and a rear bearing 94 are slidably mounted on the rail such that the bearings 93 and 94 can slide along the length of the rail 92. The bearings 93 and 94 have tapped holes on their top that can receive attachment screws. A motor carriage 62 is attached using conventional attachment means to the top of the forward bearing 93 and to the top of the rear bearing 94. The entire motor carriage 62, and all other components attached to it, can be moved linearly forward and rearward on the rail 92. A proximity sensor system is attached to the bumper block 88 such that the location of the motor carriage is sensed when it moves beyond a certain specified location towards the rear side, such as might happen when there is a tool breakage during machining. This is a safety feature to cut off the machining operation to prevent damage to the component 12. The proximity sensor system comprises a bracket 81 attached to the bumper block 88 and an electrically operated conventional proximity sensor 82 having a plunger 83 which activates the cut off system when needed. The electrical system is housed in an electrical module 116.

The motor carriage 62 has a cavity for receiving a motor housing 64 partially located within it. The motor housing 64 is pivotably attached to the motor carriage 62 using a pair of motor housing mounts 90. The motor housing mounts 90 are firmly attached near their lower end to the motor carriage 64 using conventional attachment means. The motor carriage 62 has a pivot 71 on each side that is supported by the motor housing mounts 90. In the exemplary embodiments shown herein, the pivots 71 are shown in the form of screws attached to the housing mounts 90 near their top that engage with corresponding holes on the sides of the motor carriage 62. Other suitable pivoting means may also be used alternatively. A motor 60 is located within the motor housing 64 and held within the motor housing conventional means, such as attachment screws. FIGS. 5 and 6 show a pneumatic motor 60, driven by air supplied through an air line 112. The air supply line 112 is connected to the pneumatic motor 60 using a quick-connect attachment 110. Any other suitable type of powering system such as an electric motor or hydraulic actuator may also be used instead of a pneumatic motor. A spring block 50 is attached using conventional means to the carriage base 95 which is located at the forward end of the motor carriage 62. The spring block 50 has a compression spring 52 attached to it and has a spring post located inside the spring and attached to the spring block 50. The spring post guides the spring and prevents buckling when the spring exerts a force on the spring block 50 and the motor carriage 62. In the exemplary embodiment shown in FIGS. 5 and 7, the spring 52 is attached within a slot in the spring block 50. The components of the system described herein may be manufactured using any suitable material which is light weight, preferably using Aluminum.

Figure 7:
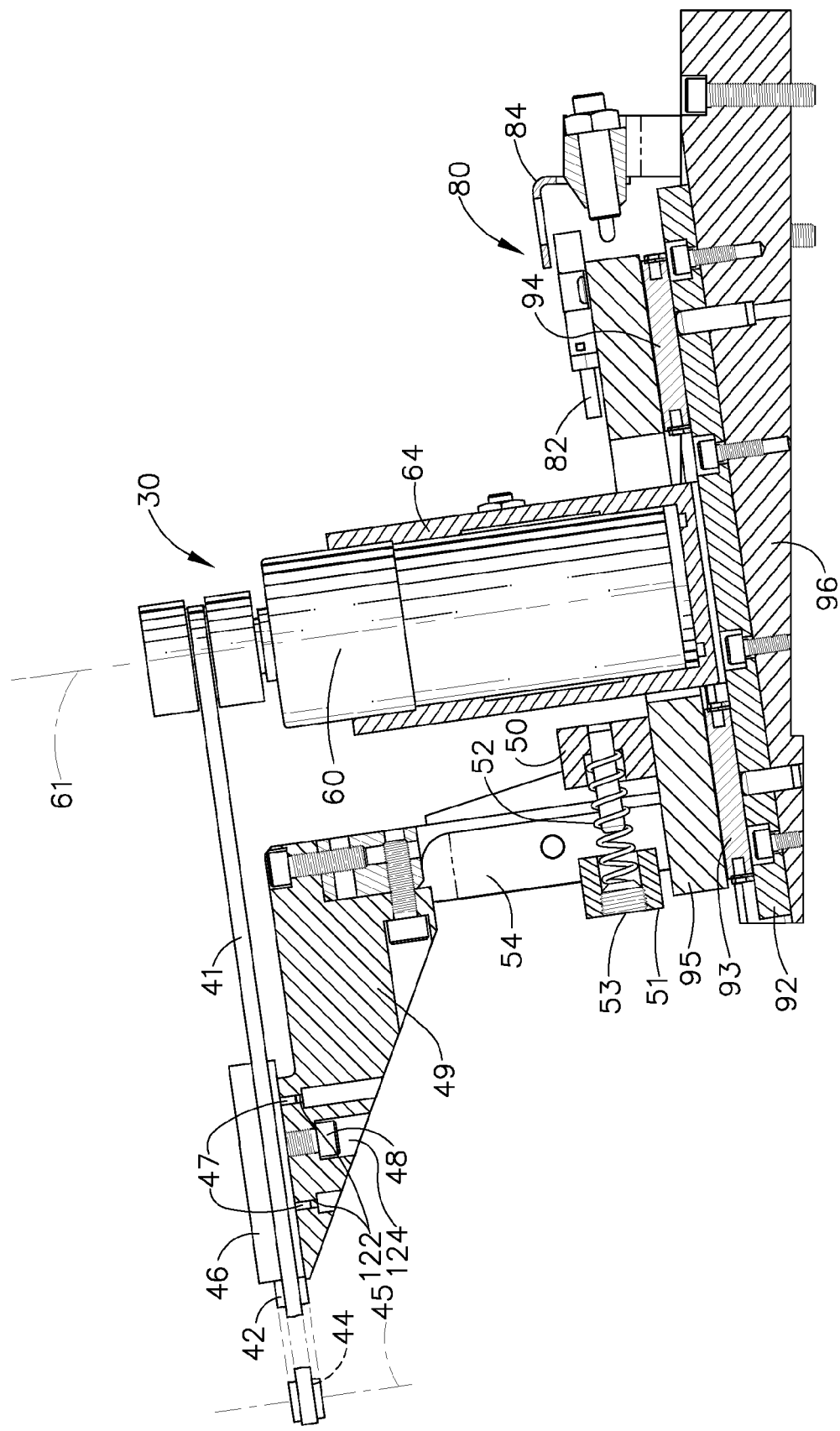
FIG. 7 shows a cross sectional view of the exemplary embodiment of the present invention shown in FIG. 6.
Figure 8:
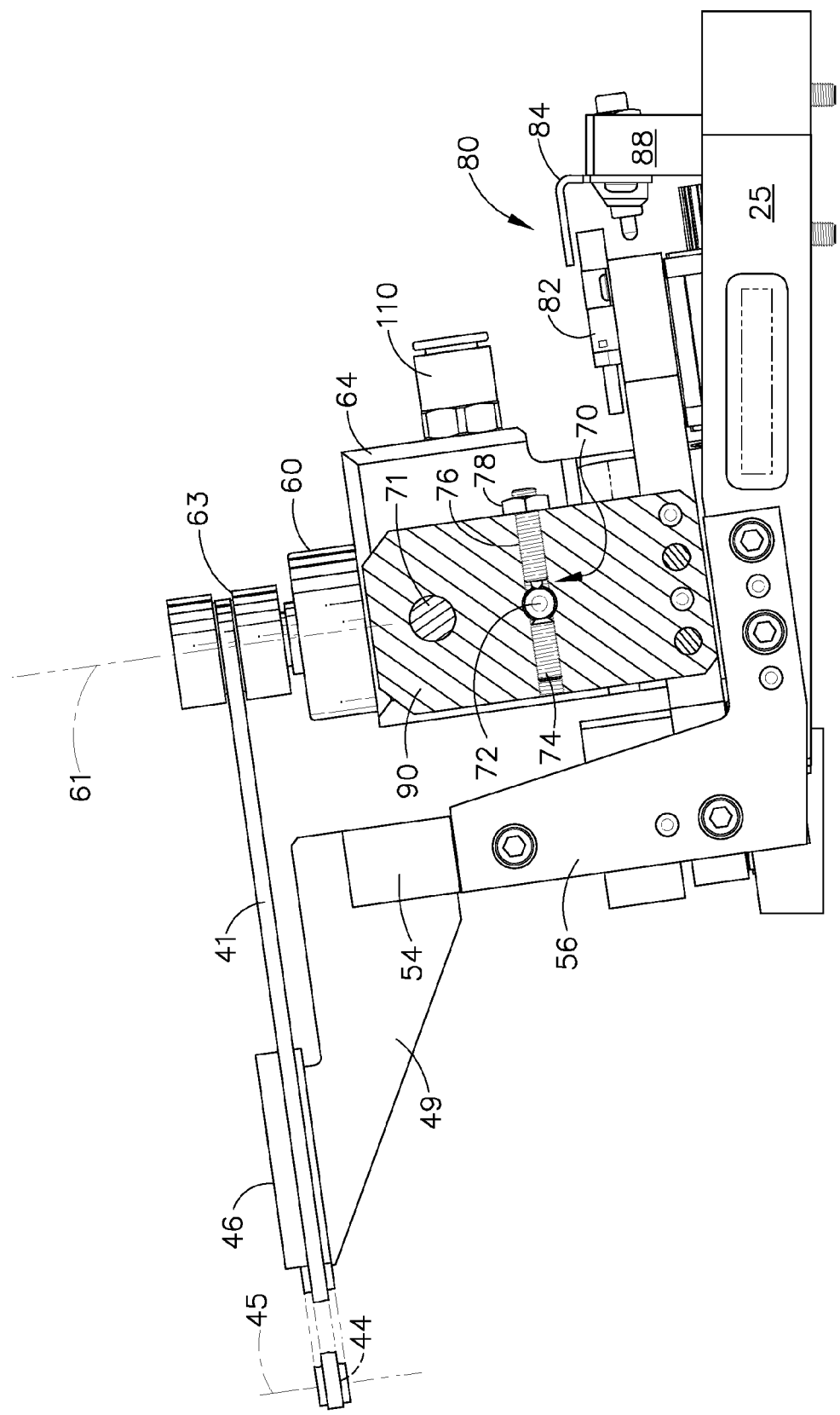
FIG. 8 shows a side view with a partial cross section of the exemplary embodiment of the present invention shown in FIG. 6.

An exemplary embodiment of the present invention for absolutely locating the true position of a machining tool contact point 43 with respect to the tool mount system 22 and flexibly mounting the drive system 30 in the fixture 20 is shown in FIGS. 6-8. Referring to these Figures, riser gussets 56 are located at the forward end of the base 25 attached to the sides of the base plate 25 using conventional attachment means. A vertical frame 54 having an arch-type shape is attached to the riser gussets 56 such that the riser gussets provide lateral support to the vertical frame 54. The vertical frame may also be attached at its lower end to the forward end of the base 25.

Referring to FIG. 6, a spring base 51 is attached to the forward end face of the vertical frame 54. As described before, the aft end the spring 52 is attached to the spring block 50. The forward end of the spring 52 is attached to the spring base 51. This is shown in cross sectional view in FIG. 7. The forward end of spring fits within to a cavity located near the middle of the spring base 51 and is held in place by an adjustment screw 53. During the machining operations, as explained subsequently herein, the spring 52 exerts a force on the spring block 50 attached to the carriage 62 and pushes the carriage aft, away from the vertical frame 54. The adjustment screw can be adjusted to control the magnitude of the force generated in the spring.

The true position of a machining tool contact point 43 is absolutely located in space using a tool contact arm 42, arm locator pins 47, and an arm mount 49. The arm mount 49 is rigidly attached to the top of the vertical frame 54 using conventional means. The arm mount provides support to the machining tool, such as the polishing tool 40, during machining and transmits the reaction forces from the tool to the motor carriage 62 which can slide along the rail 92.

FIGS. 6, 7 and 8 show a device for polishing and deburring a component, having a polishing and deburring tool 40. The tool 40 comprises a roller 44 attached to the forward end of a contact arm 42 that is clamped to the arm mount 49 using an arm clamp 46. The roller is capable of rotating around a roller axis of rotation 45. The arm clamp 46 is located on the arm clamp using arm locator pins 47, as described herein. The tool 40 has an abrasive belt 41 that is supported by the roller 44 at the forward end and by a belt drive wheel 63 at the aft end. The belt drive wheel 63 is attached to the drive motor 60 and rotates around an axis of rotation 61. The abrasive belt 41 is driven by the motor 60 and the belt drive wheel 63 around the roller 44. For polishing and deburring, removal of material from the component 12 is accomplished by contacting the moving abrasive belt 41 on the component 12 surfaces and edges. The contact point 43 forces during machining between the abrasive belt 41 and the component 12 are transmitted by the contact arm 42 to the arm mount 49 and the vertical frame 54. These forces are transmitted to the motor carriage 62 which can move along the rail 92. The abrasive belt has a tension which tends to pull the two axes of rotation 45 and 61 toward each other. This is opposed and reacted by the compressive force that is set in the spring 52 using the adjustment screw 53. The tension in the abrasive belt 41 is set using the adjustment screw 52. It is noted that because of the unique way of mounting the contact arm 42 and machining tool such as 41, the machining forces or other tool conditions do not alter the spatial location of the tool contact point 43 which is absolutely located at the specified locations in space at all times during machining. These factors which change the true location of tool contact points in conventional machining systems are accommodated in the present invention by automatically changing the position of the flexibly mounted drive motor carriage 62 on the rail 92 due to the compressive forces from the spring 52 exerted on the carriage 62 through the spring block 50.

In one aspect of the invention, the exemplary embodiments described herein incorporate a proximity sensor system 80 which can detect tool failure or tool wear conditions during machining and provide a means for safely shutting down the machining operations without damaging the component 12 being machined. The proximity sensor system 80 comprises a proximity target 84 attached to the bumper block 88 that is located near the aft end of base 25, and a proximity sensor 82 mounted on the motor carriage near its aft end. Referring to FIG. 7, during machining, if there is a significant loss of tension in the abrasive belt 41 such as from wear, track jump, or breakage, the energy stored in the compressed spring 52 will apply a force on the spring block and eject motor carriage rearwards along the rail 92. The proximity sensor 82 will sense the position of the motor carriage 62 and send an electrical signal to the robot or machining center to safely shut down the system or take other appropriate actions to prevent damage to the component 12. Bumpers and plungers are provided on the bumper block 84 and proximity sensor to absorb any shock load that may be induced due to the sudden ejection of the motor carriage 62.

In belt driven systems, belts can jump the track from the pulleys or other drives if the drive system axis is not properly aligned. In an aspect of the present invention, the exemplary embodiments described herein incorporate means for adjusting the orientation of the motor axis of rotation 61 and adjust tracking of the polishing belt in the belt drive wheel 63. An exemplary implementation of this feature is shown in FIG. 8. As explained previously herein, the drive motor 60 is located within a motor housing 64 which is pivotably attached to the mounts 90 using motor housing pivots 71. In addition, a motor housing alignment pin 72 is inserted into a corresponding recess in the wall of motor housing 64 and the motor housing mount 90. An alignment set screw 76 and a locking set screw 74 are provided within the motor housing mount 90. By appropriately adjusting the alignment set screw 76 and the locking set screw 74, the orientation of the axis of rotation 61 of the motor 60 can be changed as necessary for proper alignments of the drive system 30. Belt tracking within the belt groove of the belt drive wheel 63 may change as the belt 41 wears during operation. The means described above can be used to adjust belt tracking to ensure that the polishing belt remains within the groove and on the roller 44.

Figure 9:
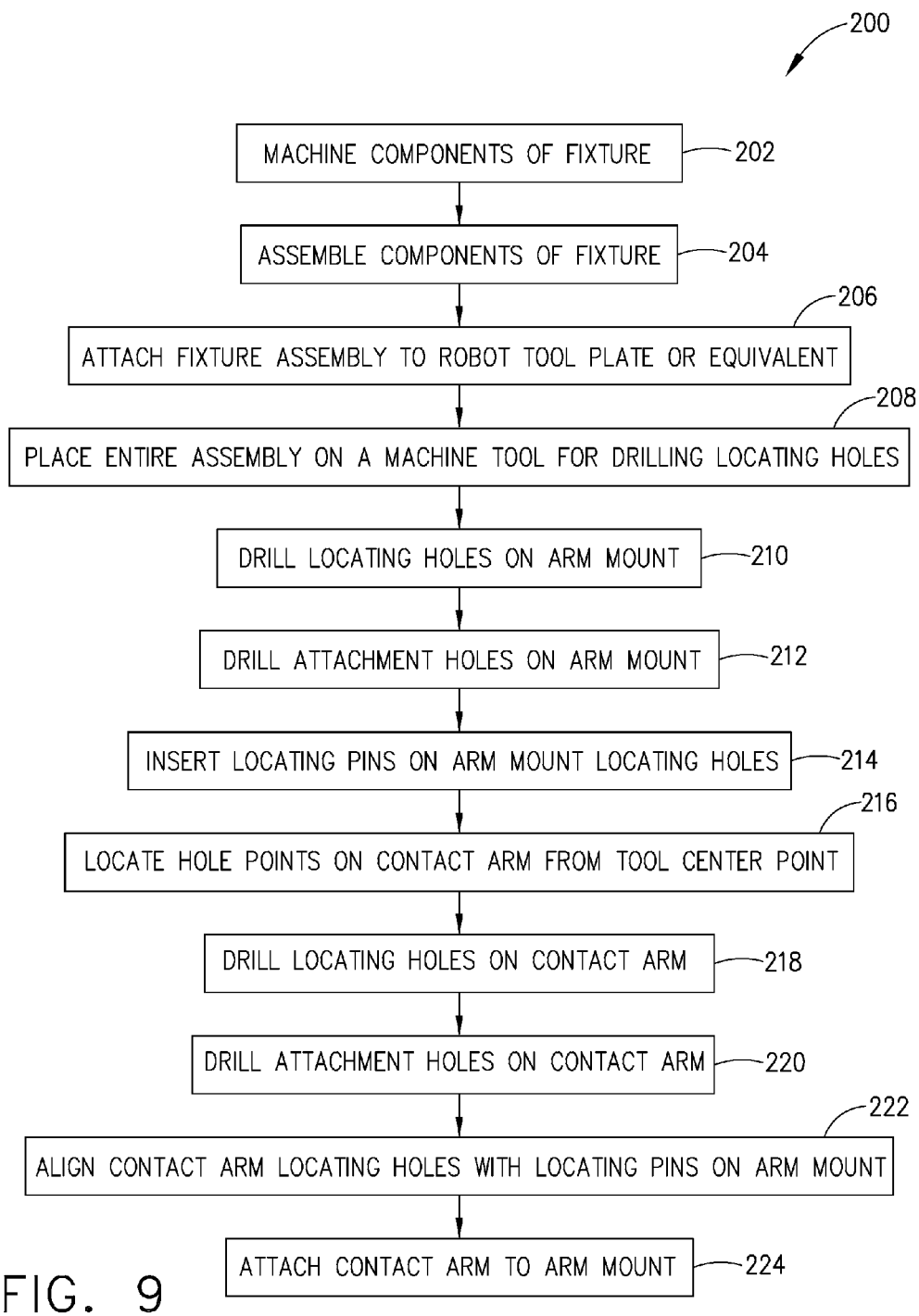
FIG. 9 shows a method of manufacturing interchangeable robotic tool assemblies.

In another aspect of the invention, a complete interchangeability of the different fixtures 20 and different tool contact arms 42 is attained while maintaining substantially the same true position of the tool center point with respect to the robot. This is accomplished using an embodiment of the present invention of a sequence of manufacturing and assembly steps, as shown in FIG. 9. Conventional manufacturing of individual components and their assembly inherently involves variations due to manufacturing tolerances and assembly stack-ups. These manufacturing tolerances and assembly stack-ups in conventional methods result in variations in the location of the tool center point, such as for example, represented by the tip of the contact arm 120. The tool center point is the location point in space that the robot 14 controls during robotic movements. The robot 14 controls the position, velocity and rotation of this tool center point 120 to be what is necessary to accomplish the specified goals in manufacturing, inspection, and other robotic uses.

An exemplary embodiment of the present invention of a method 200 of manufacturing a tool assembly, such as for example shown in FIG. 6, is shown in FIG. 9 as a series of steps identified by numerals 202-224. In the first step, numeral 202, the individual components such as base 25, riser gussets 56, vertical frame 54 etc. shown in FIGS. 2-8 are manufactured using conventional means. All the characteristics of the individual components except the arm mount locating holes 122 for the locating pins 47 (see FIG. 7) and the arm locating holes 132 (see FIG. 6) are generated. These individual components are then assembled (numeral 204) as described previously herein. The fixture assembly is attached (numeral 206) to the tool plate 21 of the robot or other machining center or another appropriate component that is located relative to the coordinate system 17 (see FIG. 1). Alternatively, an equivalent tool plate such as a slave tool plate which has the same locational characteristic dimensions with respect to the coordinate system 17 can also be used. The entire assembly is then set up (numeral 208) on a conventional machine tool, such as a milling machine or a drilling machine, for drilling the locating holes 122 in the arm mount 49. During this set up, the robot tool plate 21 (or the equivalent slave tool plate if used) is used to set the machine origin. This feature of the exemplary embodiment 200 of the present invention ensures that, regardless of any stack-up of tolerances due to the individual component machining and assembly process, the true position location of the locating holes 122 and locating pins 47 with respect to the robot coordinate axis 17 is substantially the same on each fixture 20 that is manufactured. Once the set up as described is complete, the locating holes 122 on the arm mount 49 are drilled (numeral 210). Reaming of the holes is optionally performed. The attachment holes 124 are then drilled (numeral 212) on the arm mount 49, for later use for attaching an arm clamp 46. The locating pins 47 are pressed fit into the locating holes 122 (numeral 214). Alternatively, locating pins may be pressed fit into the locating holes 132 on the contact arm, described below. Because of the set up described herein to create the locating holes 122, the locating pins 47 will be in substantially the same spatial location, with respect to the robot coordinate axis 17, on every fixture 20 that is manufactured using this method 200.

The points at which the locating holes 132 are to be drilled on the contact arm 42 are then located (numeral 216). These locations of the holes on the contact arm 42 are dimensioned from the tool center point 120 located at the tip of the contact arm 42. The locating holes 132 are then drilled in the contact arm 42 (numeral 218). Attachment holes 134 may also be drilled in the contact arm 42 (numeral 220). The contact arm locating holes 132 are then aligned with the locating pins 122 on the arm mount 49 (numeral 222). The contact arm 42 is then attached to the arm mount 49 (numeral 224) using the attachment holes 124 and 134 and cap head screws 48 or other conventional attachment means.

As described before herein, in the case of robot 14, the only point the space that the robot absolutely must control is the tool center point 120. The robot 14 controls the position, velocity and rotation of this tool center point 120. Because of the unique way of locating the locating holes 132 on the contact arm 42 as described herein, on every contact arm 42 manufactured, the geometric relationship from the tool center point 120 to the locating holes 132 is substantially the same. For every fixture 20 manufactured according to the method 200, the locating pins 47 and the contact arm 42 and the contact arm tool center point 120 are substantially at the same spatial location with respect to the robot coordinate system 17, and are interchangeable during manufacturing because the geometric relationship of the tool center point 120 to the robot or other machining center is substantially the same.

Although the embodiments of the present invention are described herein in the context of machining tools, such as the polishing tool 40, it is understood that the components, assemblies, features and methods disclosed herein are similarly applicable in other contexts as well, such as for example, non-destructive evaluations and dimensional inspections of complex components such as BLISKs. This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for performing a polishing operation on a component, the system comprising:
   a robot having a robotic arm;
   a fixture comprising a base;
   a mount system coupled to the fixture for attaching the fixture to the robotic arm;
   a drive system comprising a motor mounted on the fixture using a carriage that is slidably coupled to a rail that is fixedly attached to the base; and
   a polishing tool comprising a contact arm supported by a frame that is rigidly attached to the base wherein the polishing tool is driven by the motor such that the location of a tool center point of the polishing tool is controlled by the robot during the polishing operation.

2. A system according to claim 1 wherein:
   the contact arm has a contact roller and wherein the polishing tool comprises a polishing belt.

3. A system according to claim 2 further comprising:
   a spring attached to the fixture for maintaining a tension on the polishing belt.

4. A system according to claim 1 further comprising a means for adjusting the tracking of a polishing belt by adjusting the orientation of the motor axis.

5. A system according to claim 1 wherein the motor is supported by a motor housing that is pivotably mounted on the carriage.

6. A system according to claim 1 further comprising a proximity sensor system mounted on the fixture for detecting changes in the condition of the polishing tool.

7. A system according to claim 1 further comprising a means for adjusting the polishing tool tracking, said means comprising a pivot and an alignment screw.

8. A system according to claim 1 wherein the motor is a pneumatic motor.

* * * * *